United States Patent [19]

Saeki et al.

[11] Patent Number: 5,096,177
[45] Date of Patent: Mar. 17, 1992

[54] RECYCLING AUTOMATIC DOCUMENT FEEDER FOR FEEDING DOCUMENTS OF VARIOUS SIZE FOR USE WITH A COPIER

[75] Inventors: Shiro Saeki, Yokohama; Goro Mori; Masumi Ikesue, both of Tokyo; Fumitaka Hyodou; Kunihiro Uotani, both of Okazaki, all of Japan

[73] Assignee: Ricoh Company, Ltd., Tokyo, Japan

[21] Appl. No.: 514,720

[22] Filed: Apr. 26, 1990

[30] Foreign Application Priority Data

| Apr. 26, 1989 | [JP] | Japan | 1-104677 |
| Apr. 26, 1989 | [JP] | Japan | 1-104679 |
| Apr. 26, 1989 | [JP] | Japan | 1-104680 |
| Apr. 26, 1989 | [JP] | Japan | 1-104681 |
| Apr. 26, 1989 | [JP] | Japan | 1-104682 |
| Jan. 31, 1990 | [JP] | Japan | 2-19322 |

[51] Int. Cl.⁵ ............................................. B65H 5/22
[52] U.S. Cl. ........................................... 271/3.1; 271/119; 271/171; 271/186; 271/223
[58] Field of Search .................. 271/3, 3.1, 7, 147, 271/171, 213, 223, 200, 245, 254, 119, 272, 275, 165, 185, 186

[56] References Cited

U.S. PATENT DOCUMENTS

| 4,219,191 | 8/1980 | Rastorguyeff | 271/171 X |
| 4,469,436 | 9/1984 | Jones et al. | 271/3.1 X |
| 4,786,039 | 11/1988 | Ito | 271/3.1 |
| 4,815,722 | 3/1989 | Sugimoto | 271/171 X |
| 4,869,488 | 9/1989 | Hirota et al. | 271/3.1 |
| 4,957,285 | 9/1990 | Yamada | 271/3.1 |

FOREIGN PATENT DOCUMENTS

| 191935 | 9/1985 | Japan | 271/3 |
| 92144 | 4/1989 | Japan | 271/3 |

Primary Examiner—Robert P. Olszewski
Assistant Examiner—Boris Milef
Attorney, Agent, or Firm—Oblon, Spivak, McClelland, Maier & Neustadt

[57] ABSTRACT

A recycling automatic document feeder for a copier which feeds a stack of documents loaded on a document table one by one to a predetermined exposing position, returning the document to the top of the stack after imagewise exposure, and refeeding such documents one by one to the exposing position. A discharge section is movable on and along the table in an intended direction of document feed. The document feeder is capable of returning documents of various sides easily to the top of the document stack which is located at a document feed position on the table.

10 Claims, 14 Drawing Sheets

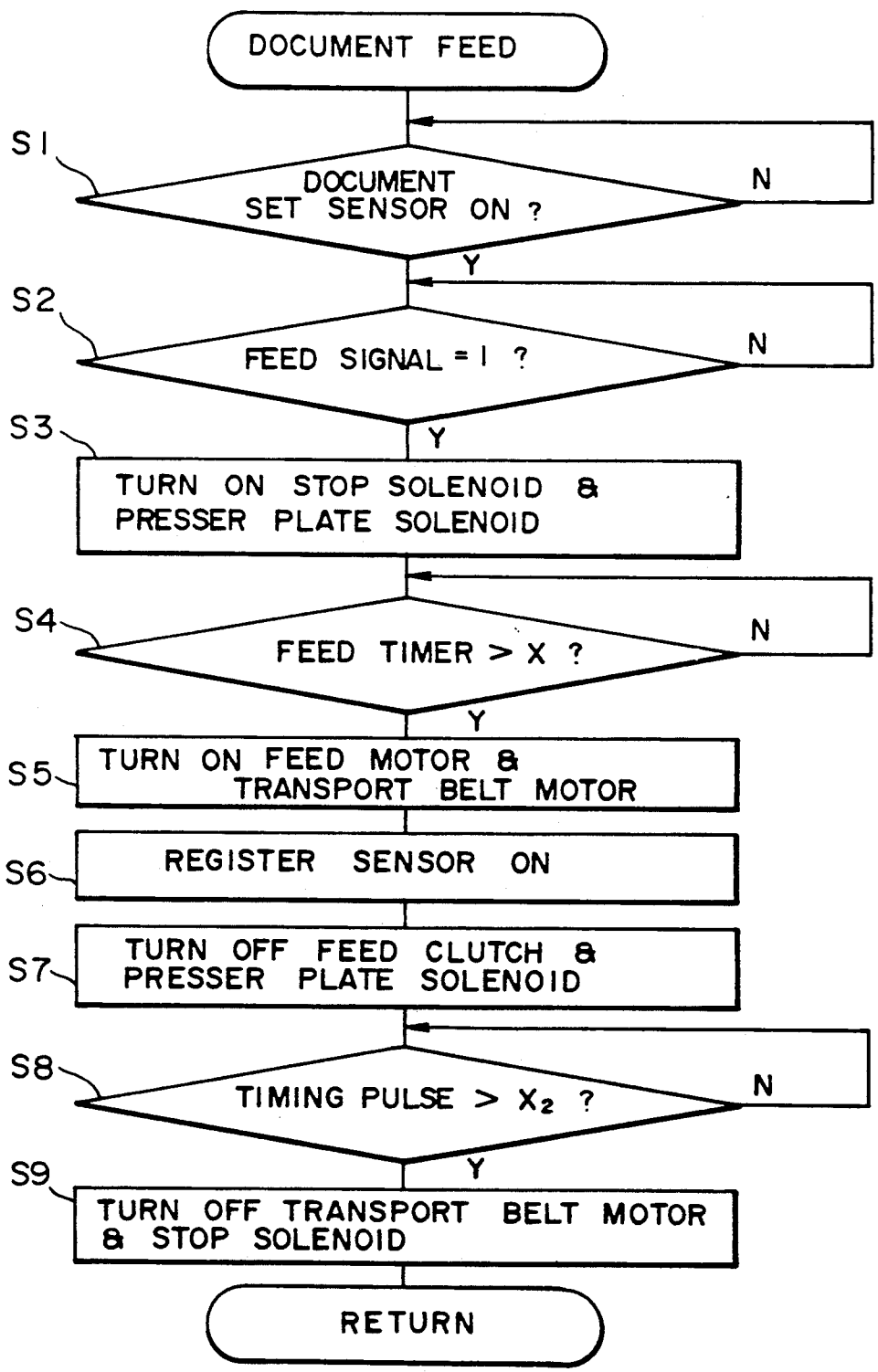

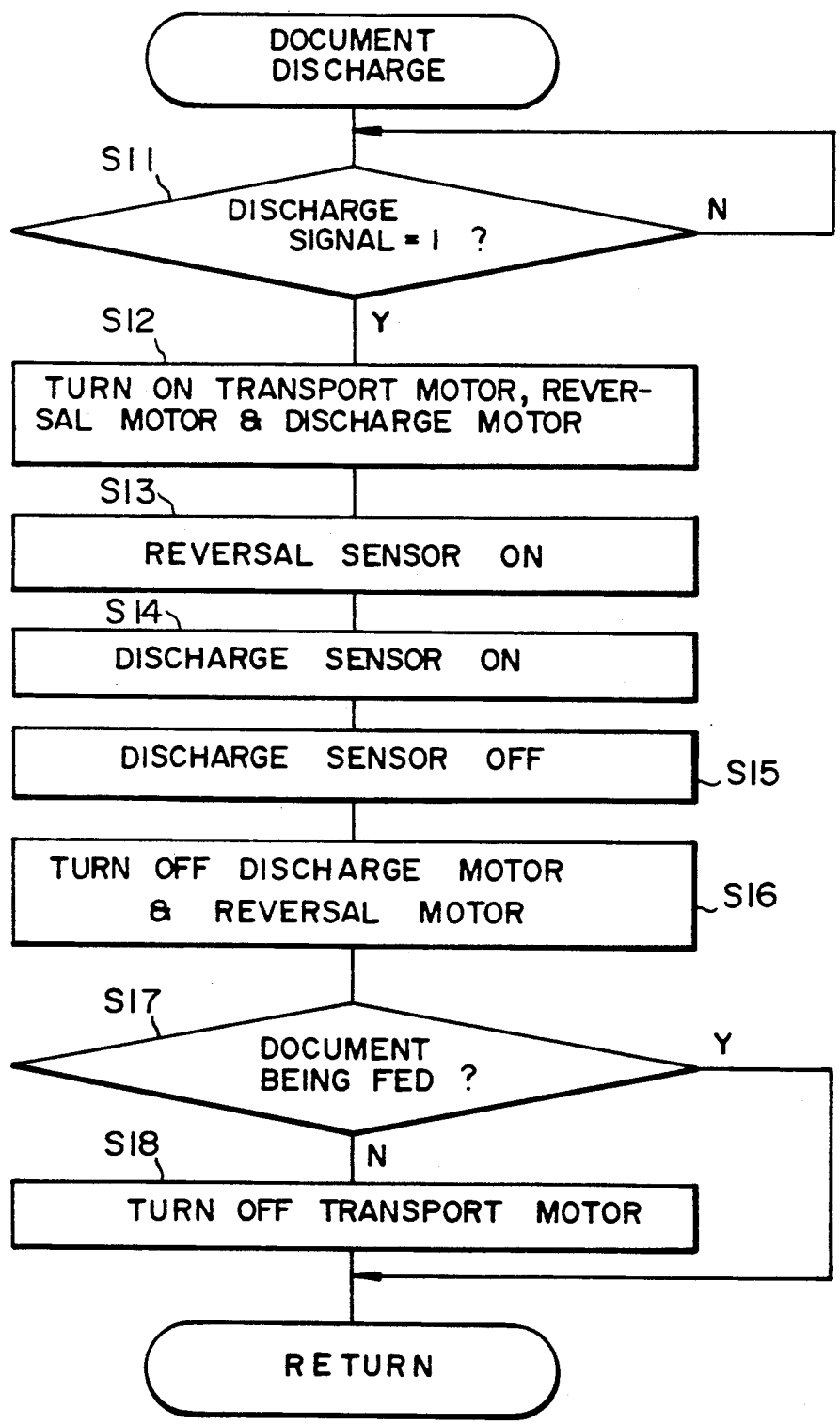

RECYCLING AUTOMATIC DOCUMENT FEEDER FOR FEEDING DOCUMENTS OF VARIOUS SIZE FOR USE WITH A COPIER

BACKGROUND OF THE INVENTION

The present invention relates to a recycling automatic document feeder (RADF) for a copier which feeds a stack of documents one by one from a document table to an exposing position, returns the document from the exposing position to the top of the document stack after imagewise exposure, and refeeds such documents one by one to the exposing position.

Various kinds of copiers, printers and facsimile machines are extensively used as an image forming apparatus for forming images of documents. With this kind of image forming apparatus such as a copier, a RADF is available as means for automatically feeding documents one by one to a glass platen so as to save time and labor. A RADF has a belt for feeding documents stacked on a document table one by one, the lowermost document being first, to a glass platen of the copier body via an inlet. After the document has been scanned for exposure, the belt returns it to the top of the document stack on the table via an outlet. Specifically, the documents are repetitively routed through a circulation path made up of a feed path and a return path in order of page and by a number of times associated with the desired number of copies. To preserve the copying order of the stack of documents, it is necessary that the document driven out from the outlet after imgewise exposure be at least partly laid on the uppermost document. Also, to refeed the circulated document to the feed path, it is necessary that the document driven out from the outlet be at least partly laid on the belt. More specifically, the distance $l_1$ between the outlet and the inlet, the distance $l_2$ between the outlet and the rear end of the belt, and the length L of the document as measured in an intended direction of document feed have to be related to one other, as follows:

$$l_1/2 < L \leq l_1 \text{ and } L > l_2$$

The above relationships cannot be satisfied without imposing substantial limitations on the length of the document as measured in the intended direction document feed which is usable with the RADF.

A RADF whose outlet, for example, is variable in position in matching relation to the length of documents as measured in the intended direction of document feed has been proposed to eliminate the above limitations. Specifically, such a RADF shifts the outlet by using a telescopic discharge guide or a foldable discharge belt. This implementation, however, does not allow the outlet to move beyond a certain limited range and needs a complicated structure. A RADF capable of shifting the outlet over a substantial range by a relatively simple construction is disclosed in, for example, Japanese Patent Laid-Open Publication (Kokai) No. 143125/1988. However, the RADF proposed in this Laid-Open Publication cannot operate satisfactorily with a broad range of document lengths and, when its return path is jammed by a document, needs troublesome operations for the removal of the jamming document.

SUMMARY OF THE INVENTION

It is therefore an object of the present invention to provide a RADF which feeds documents of various sizes with a simple construction.

It is another object of the present invention to provide a RADF which feeds documents of various sizes and transports documents without causing them to be caught.

It is another object of the present invention to provide a RADF which is miniature and, yet, capable of dealing with a broad range of document sizes.

It is another object of the present invention to provide a RADF which feeds documents of various sizes and allows a return path thereof to be readily uncovered.

It is another object of the present invention to provide a RADF which feeds documents of various sizes and surely drives a document out of a discharge section onto a stack of documents loaded on a document table.

It is another object of the present invention to provide a generally improved RADF for a copier.

A recycling automatic document feeder for repetitively feeding documents one by one to a predetermined exposing position of an image forming apparatus of the present invention comprises a document feeding section comprising a document table to be loaded with a stack of a plurality of documents, and a feed mechanism for feeding the stack of documents one by one, the lowermost document being first, a document transporting section comprising a transport mechanism for transporting the document fed by the document feeding section to the exposing position and discharging the document after imagewise exposure, a document reversing section comprising a reverse mechanism for turning over the document discharged by the document discharging section, and a document returning section comprising a return path for discharging the document from the document reversing section such that the document lies on the stack of documents on the document table. The return path of the document returning section comprises a rear part of a document stack loading range available on an upper surface of the document table with respect to an intended direction document feed.

BRIEF DESCRIPTION OF THE DRAWINGS

The above and other objects, features and advantages of the present invention will become more apparent from the following detailed description taken with the accompanying drawings in which:

FIGS. 18 and 19 are flowcharts demonstrating respectively a document feed and a document discharge operation of the embodiment.

DESCRIPTION OF THE PREFERRED EMBODIMENT

To better understand the present invention, a brief reference will be made to some prior art RADFs, shown in FIGS. 1 to 5.

Figure 1:
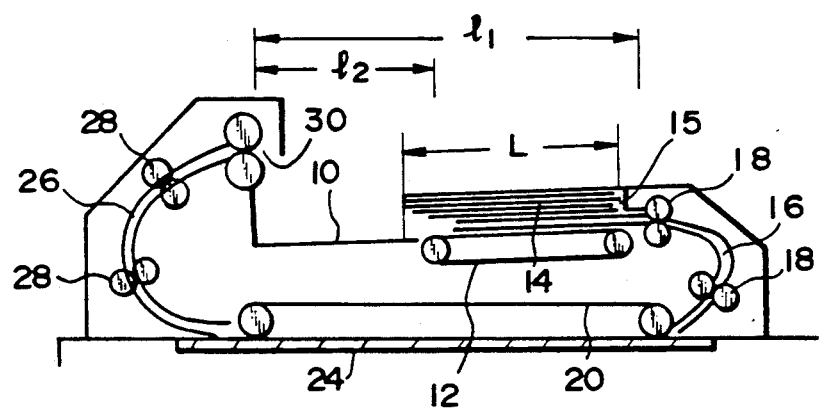
FIGS. 1 to 5 are sectional side elevations each showing a different prior art RADF.
Figure 2:
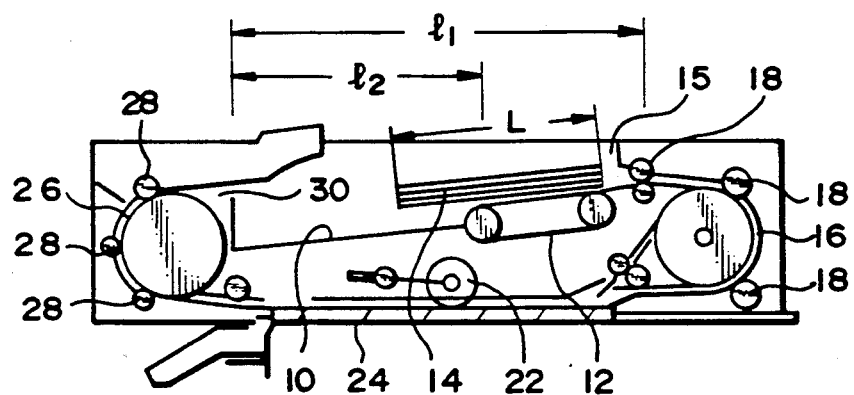

The prior art RADFs shown in FIGS. 1 and 2 share the same principle of operation. Specifically, each of them has a belt 12 associated with a document table 10 for paying out a stack of documents 14 one by one from the table 10. When a copying operation is started, the belt 12 pulls the lowermost document out of the stack 14 and pays it out through an inlet 15. The document is passed over to a plurality of rollers 18 which are located at spaced positions along a generally U-shaped feed path 16. Subsequently, the document is driven by a belt 20 (FIG. 1) or a roller 22 (FIG. 2) to a predetermined position on a glass platen 24. After the document has been optically scanned, it is driven out to a generally U-shaped return path 26 by the belt 20 or the roller 22. Then, the document is passed over to a predetermined number of rollers 28 provided on the return path 26 and is thereby discharged through an outlet 30 onto the table 10 to be laid on the top of the stack 14. A prerequisite with this kind of configuration is that the document returned through the outlet 30 be at least patly laid on the uppermost document of the stack 14 so as to prevent the copying order of the stack 14 from being disturbed. Another prerequisite is that the document discharged through the outlet 30 be at least partly positioned on the belt 12 so that it may be fed out to the feed path 16 again. Hence, the distance $l_1$ between the outlet 30 and the inlet 15, the distance $l_2$ between the outlet 30 and the rear end of the belt 12, and the length L of the document as measured in the intended direction of document feed have to be related to one another as follows:

$$l_1/2L \leq l_1 \text{ and } L > l_2$$

Stated another way, the length, especially the minimum length, of documents usable with the prior art RADFs shown in FIGS. 1 and 2 as measured in the direction of document feed is severely limited.

Figure 3:
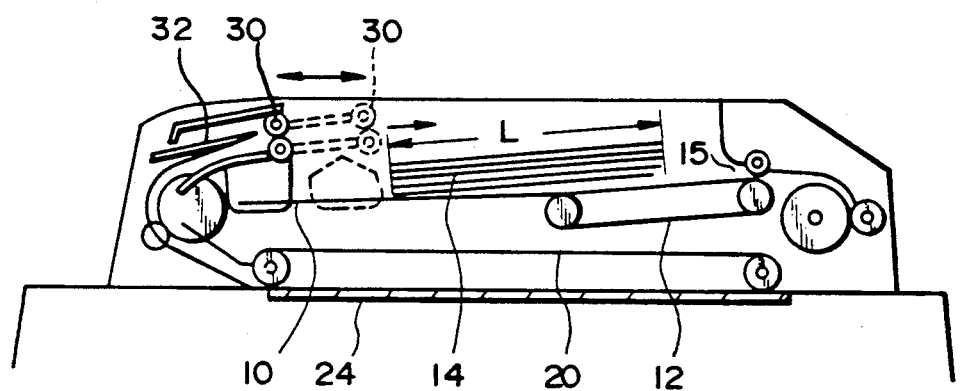
Figure 4:
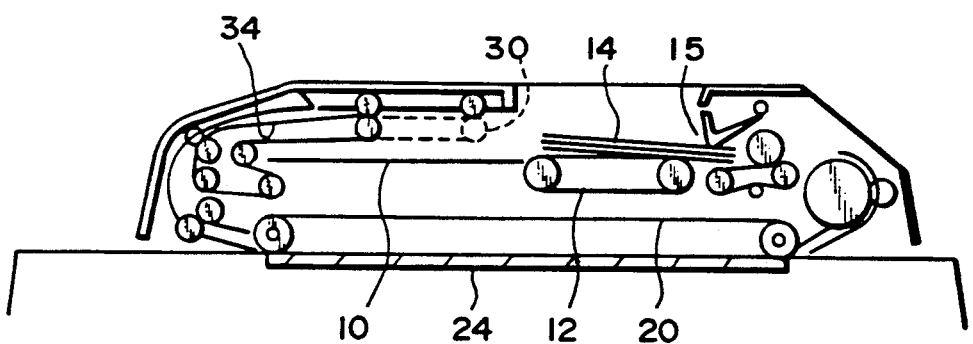

FIGS. 3 and 4 show other prior art RADFs which are elaborated to eliminate the above-discussed drawback by shifting the outlet 30 in matching relation to the length L of documents. Specifically, the RADF of FIG. 3 implements such a shiftable outlet 30 by a telescopic discharge guide 32, while the RADF of FIG. 4 implements it by a foldable discharge belt 34. The telescopic guide scheme has a drawback that the shiftable range of the outlet 30 is limited by the overlapping length of the discharge guide 32. The foldable belt scheme is not practicable without resorting to a complicated mechanism and needs time- and labor-consuming operations in the event of mounting and replacing the discharge belt 34.

Figure 5:
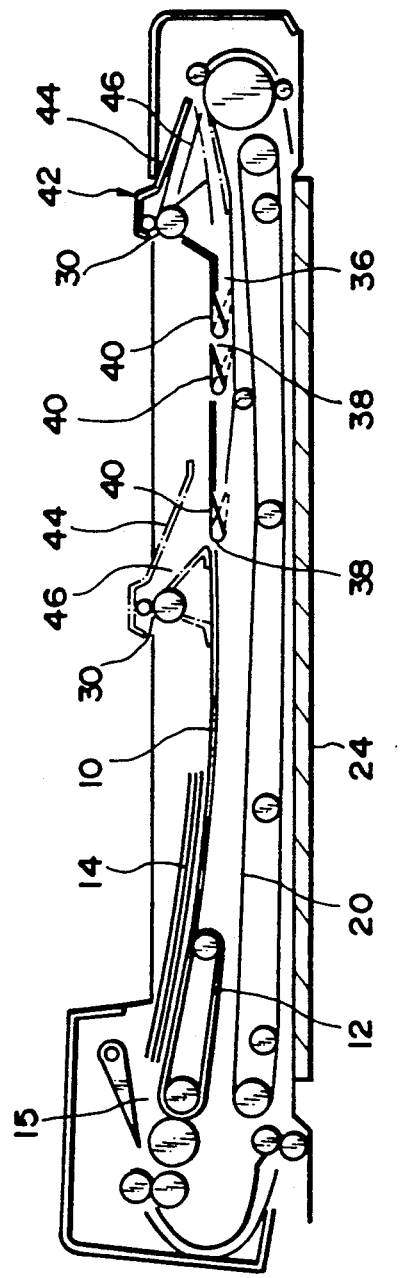

A RADF capable of changing over the position of the outlet over a broad range with a relatively simple construction is disclosed in previously mentioned Japanese Patent Laid-Open Publication No. 143125/1988. As shown in FIG. 5, the disclosed RADF has a return path 36 extending over a substantial range at the inlet side and below the table 10. The table 10 is provided with a plurality of slots 38 and a plurality of movable pawls 40 each being associated with respective one of the slots 38. Located at spaced positions in the intended direction of document feed, the slots 38 and pawls 40 function to steer a document being transported along the return path 36 upward through the table 10. A discharge section 42 is movable on the table 10 in the direction of document feed and has an outlet 30 and a transport guide 44 which guides a document coming out of the return path 36 through any of the slots 38 and pawls 40 toward the outlet 30. Any one of the pawls 40 matching the size of desired documents is switched over to a discharge position, while the discharge section 42 is shifted to a position where it is capable of guiding a document steered by the pawl 40 to the outlet 30. Then, a document coming out of the outlet 30 is successfully laid on the top of the stack 14 which is loaded on the belt 12 whose front end faces the inlet 15. When the documents have the maximum size available with the RADF, the discharge section 42 is shifted to the rear end of the table 10. In this condition, the document returned from the glass platen 24 is directly guided by a guide plate 36 toward the outlet 30 of the discharge section 42 without being routed through the return path 36. When documents of a smaller size are used, the guide plate 46 is angularly moved to a position where the outlet faces the return path 36, so that the returned document may be introduced into the return path 36.

In the above construction, a document driven out from the glass platen 24 while being turned over is transported to the discharge section 42 along the return path 36 and then onto the stack 14 via the outlet 30 of the discharge section 42. Since the return path 26 is defined below the table 10, the guide plate 46 forming a return path can be rigidly mounted on the framework of the RADF and, therefore, the structure is simple. However, this kind of RADF cannot deal with a broad range of document sizes because the slots 38 and pawls 40 are fixed in place and because the slots 38 cannot be located at short intervals due to the inherent structure. Another drawback with such a scheme is that since the return path 36 is provided below the table 10, a document jamming the return path 36 cannot be readily removed. Concerning the removal of a jamming document, the arrangements shown in FIGS. 3 and 4 seem to be advantageous over the arrangement of FIG. 5 because they have the return path above the table 10. Nevertheless, the discharge guide 32 or the discharge belt 34 has to be operated in response to the sheet of the outlet 30. This requires at least the discharge guide 32 to be telescopically movable or the discharge belt 34 to be foldable, resulting in a complicated construction.

Figure 6:
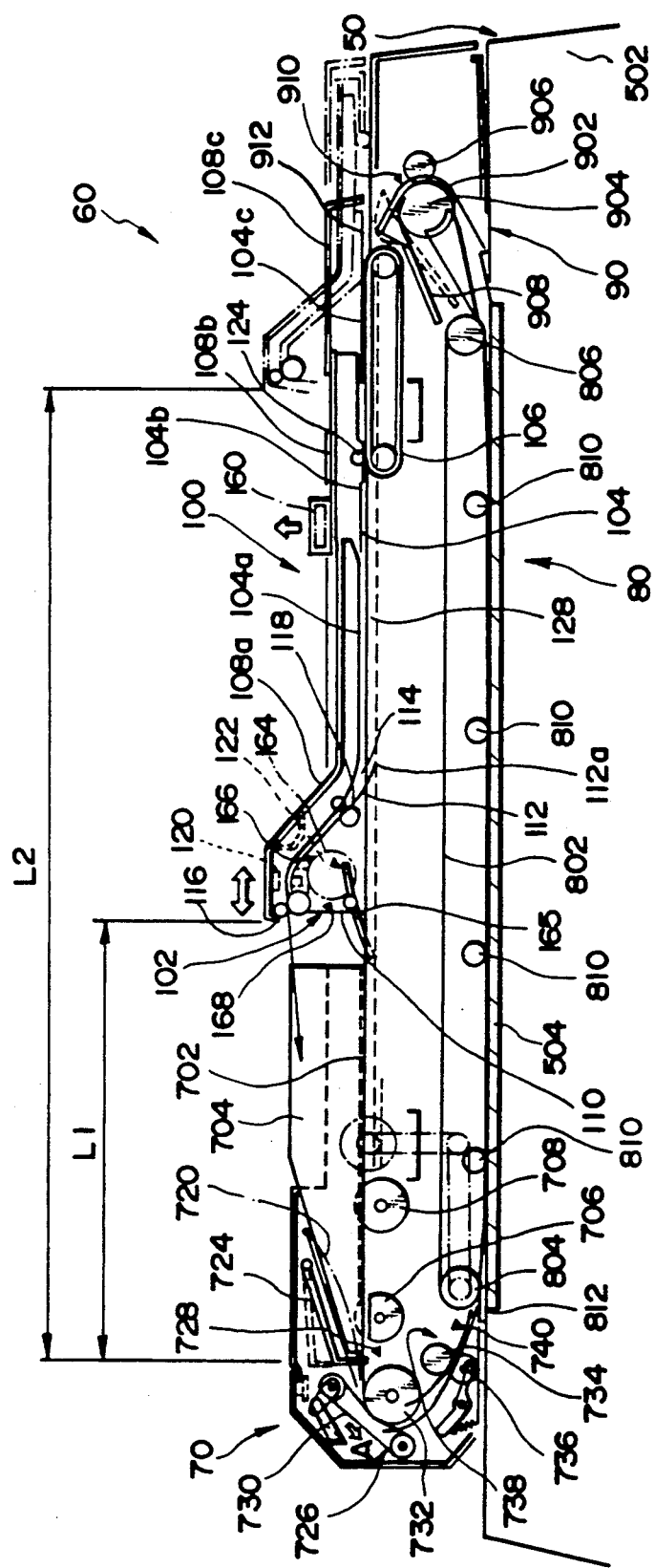
FIG. 6 is a sectional side elevation showing a RADF embodying the present invention.

Referring to FIG. 6, a RADF embodying the present invention is shown and generally designated by the reference numeral 60. As shown, the RADF 60 has a cover-type casing (no numeral) which covers a glass platen 504 provided on the top of the body 502 of a copier 50. The RADF 60 is generally made up of a feed section 70, a transport section 80, a reversal section 90 and a return section 100 which are accommodated in the casing. The feed section 70 has a table 702 extending over a substantial range in an upper portion of the casing except for opposite end portions of the latter, and a feed mechanism located at the left-hand side as viewed in the figure for feeding documents stacked on the table 702 one by one to the glass platen 504, the lowermost document being first. The transport section 80 has a transport belt 802 having a lower run held in slidable contact with the upper surface of the glass platen 504 over the entire length of the latter. The transport belt 802 transports the document fed from the feed section 70 to a predetermined position on the glass platen 504 and, after imagewise exposure, out of the glass platen 504. The reversal section 90 turns over the document driven out from the transport section 80. Further, the return section 100 returns the document having been so turned over onto the top of the stack on the table 702.

The constructions and operations of the feed section 70, transport section 80, reversal section 90 and return section 100 will be described specifically.

FEED SECTION 70

Figure 7:
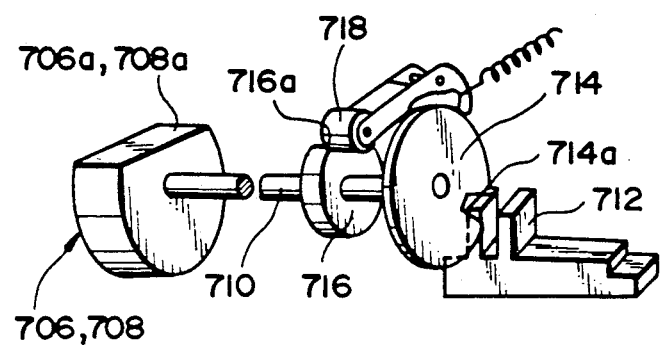
FIG. 7 is a perspective view showing a pick-up roller of the RADF shown in FIG. 1 together with a part of a pick-up roller control mechanism.

The feed section 70 has a pair side fences 704 (only one is visible) at opposite sides thereof with respect to an intended direction of document feed and within a minimum document size range which is defined in a front end portion of the table 702. Two pick-up rollers 706 and 708 having removed portions 706a and 708a, respectively, are located in the front end portion and at spaced locations along the direction document feed. The pick-up rollers 706 and 708 do not protrude from the document loading surface when their removed portion 706a and 708a face upward. As shown in FIG. 7, the rollers 706 and 708 each is mounted on a shaft 710. Also mounted on the shaft 710 are a disk 714 having a slit 714a and a positioning plate 716 having a recess 716a which corresponds in position to the removed portion 706a or 708a of the roller 706 or 708. A photoelectric sensor 712 senses the slit 714a of the disk 714. A roller 718 is constantly biased by a spring to remain in pressing contact with the circumferential edge of the positioning plate 716. In this configuration, the two pick-up rollers 706 and 708 are rotatable in synchronism with each other such that their removed portions 706a and 708a remain parallel in the same phase. As the rollers 706 and 708 are brought to an angular position where their removed portions 706a and 708a become flush with the table 702 as detected by the cooperation of the disk 714 and sensor 712, the rollers 706 and 708 are stopped and surely maintained in such a position by the positioning plate 716 and rollers 718.

Figure 8A:
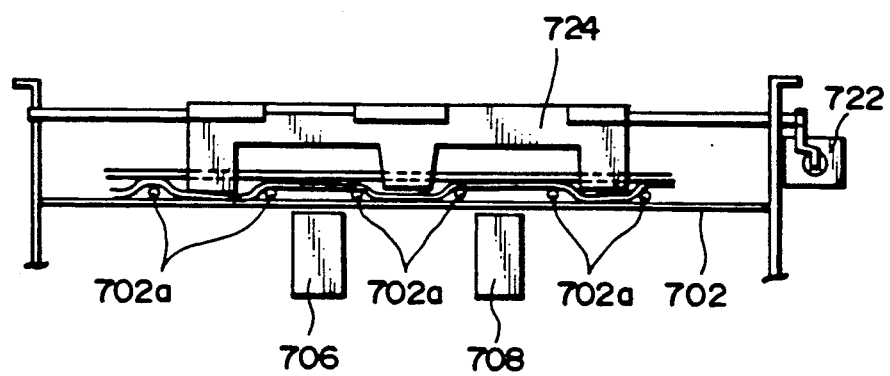
FIG. 8A is a front view showing documents stacked on a document table of the illustrative embodiment and a stop.

A presser plate 720 is located above the pick-up rollers 706 and actuated by a solenoid, not shown. When the pressor plate 720 is held in a position indicated by a phantom line in FIG. 6, it presses down a leading end portion of a paper stack against the pick-up rollers 706. A stop 724 is disposed above the presser plate 720, as also shown in FIG. 8A. Driven by a solenoid 722, the stop 724 is rotatable about its rear end between an operative position and an inoperative position which are respectively indicated by a solid line and a phantom line in FIG. 6. In the operative position, the tip of the stop 724 contacts the upper surface of the table 702 or the top of a document stack (see FIG. 8B) to position a stack of documents when the latter is set on the table 712 or to correct the skew of a document which is returned onto the top of the document stack. Concerning such an anti-skew function, the leading edge of a document being returned onto the document stack abuts against the tip of the stop 724. The stack of documents pressed against the pick-up rollers 706 and 708 by the presser plate 720 are surely fed one by one toward a separating section 726 due to the synchronous rotation of the rollers 706 and 708. A document set sensor 728 shown in FIG. 6 produces a sense signal when a stack of documents have been loaded on the table 702. In response to the sense signal, the pick-up rollers 706 and 708 are rotated by a predetermined amount to drive the document stack to a position shown in FIG. 8B.

Figure 8B:
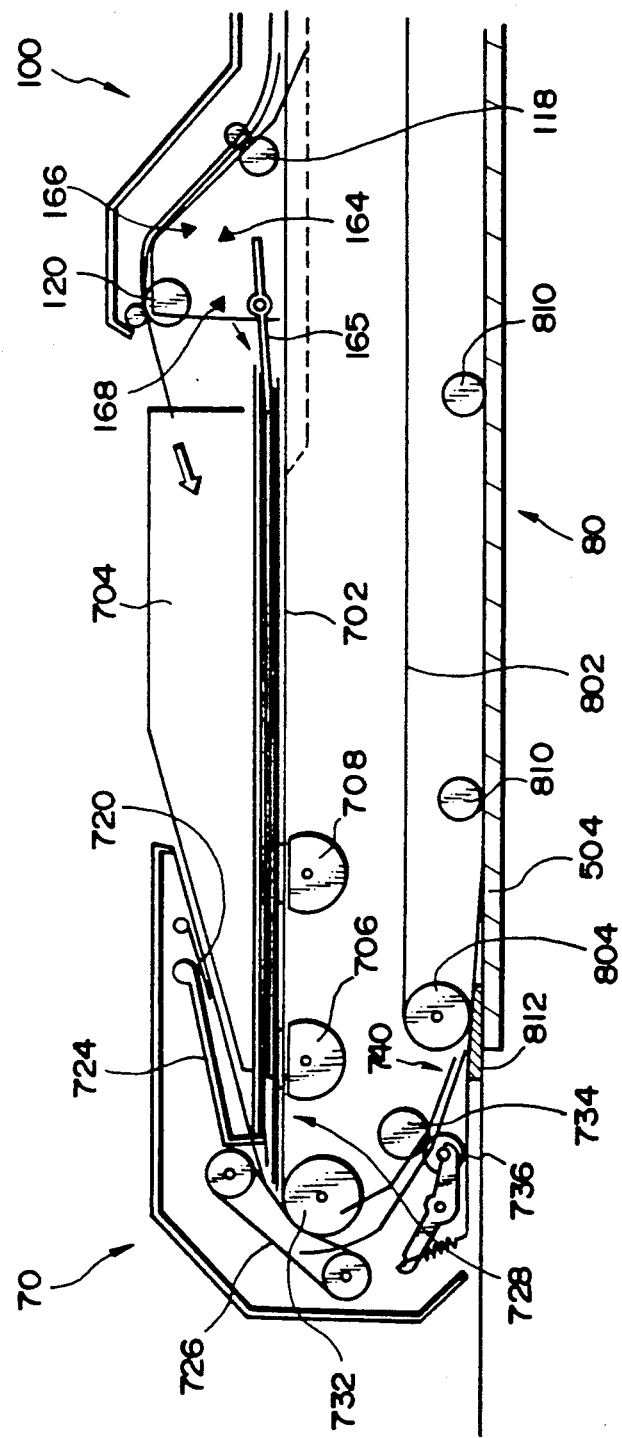
FIG. 8B is a sectional side elevation showing the construction of a feed section of the illustrative embodiment in an enlarged scale.

Another function of the pick-up rollers 706 and 708 is to surely feed only the lowermost document out of the stack which is held in the position shown in FIG. 8B, in cooperation with endless belt 730 and a separation roller 732. The separation roller 732 rotates in a direction for driving the document in the intended direction of document feed and at such a speed that its peripheral speed defines the document feed speed. The endless belt 730 is pressed against the roller 732 over a certain circumferential length of the latter and moved in the opposite direction to the intended direction of document feed (arrow A, FIG. 6) at a low speed, e.g. 1/20 of the document transport speed. The coefficient of friction between the separation roller 732 and the document, the coefficient friction between the endless belt 730 and the document, and the coefficient of friction between the documents themselves are adequately selected such that when only one document is paid out from the bottom of the document stack, it is transported to pull-out rollers 734 and 736 located downstream of the belt 730 and roller 732 while, when two or more documents are paid out together, only the lowermost document is separated and driven toward the pull-out rollers 734 an 736.

A one-way clutch is built in the separation roller 732. While the pull-out rollers 734 and 736 transport the document, the built-in clutch allows the separation roller 732 to follow the movement of the document despite that it is not driven then. This is successful in reducing the load on the document transport and allowing the document to be driven at the predetermined speed. The drive of the roller 732 is turned on and off by a clutch, not shown. A register sensor 740 is disposed in a discharge section 738 which intervenes between the feed section 70 and the transport section 80. When the register sensor senses the leading edge of the document, the above-mentioned clutch is turned off to interrupt the drive of the roller 732. The register sensor 740 also plays the role of sensing means which senses the trailing edge of the document to allow the document to be brought to a stop at a predetermined exposing position on the glass platen 504. The pick-up rollers 706 and 708, separation roller 732 and pull-out roller 734 may either be driven by a single motor or by individual motors, as the case may be.

TRANSPORT SECTION 80

The transport section 80 has the previously mentioned transport belt 802 which has a substantial width and is passed over a pair of rollers 804 and 806. The lower run of the belt 802 is pressed against the glass platen 504 by a plurality of pressing rollers 810. The belt 802, therefore, transports the document delivered from the feed section 70 to the predetermined exposing position on the glass platen 504 and, after imagewise exposure, drives it out to the reversal section 90. In the figure, the reference numeral 812 designates a scale.

REVERSAL SECTION 90

The reversal section 90 has a guide 902, a roller 904 whose periphery extends along the guide 902, and a selector in the form of a pawl 908 which is movable between two positions indicated by a solid line and a phantom line in FIG. 6. In a two-sided document mode, the selector 908 is switched over to the phantom-line position to turn over a document whose one side has been illuminated and feeds it again to the transport section 80. In a one-sided document mode or when a document whose opposite sides have been illuminated in a two-sided document mode is to be discharged, the selector 908 is brought to the solid-line position to discharge the document to the return section 100. A sensor 910 is located between the roller 906 and the selector 908 to face the roller 904 for the purpose of controlling the drive timing of the belt 802. The belt 802 and roller 904 are driven by individual motors, not shown.

RETURN SECTION 100

The return section 100 has a discharge unit 102 which is movable on the table 702 in the direction of document feed (right-and-left direction as viewed in FIG. 6). A guide 104 is connected to the rear end of the discharge unit 102 in the direction of document feed in such a manner as to extend and contract in response to the movement of the discharge unit 102, whereby a document return path is defined above the table 702 and at the rear of the discharge unit 102. An intermediate belt 106 transports the document driven out from the reversal section 90 to the discharge unit 102.

Figure 9:
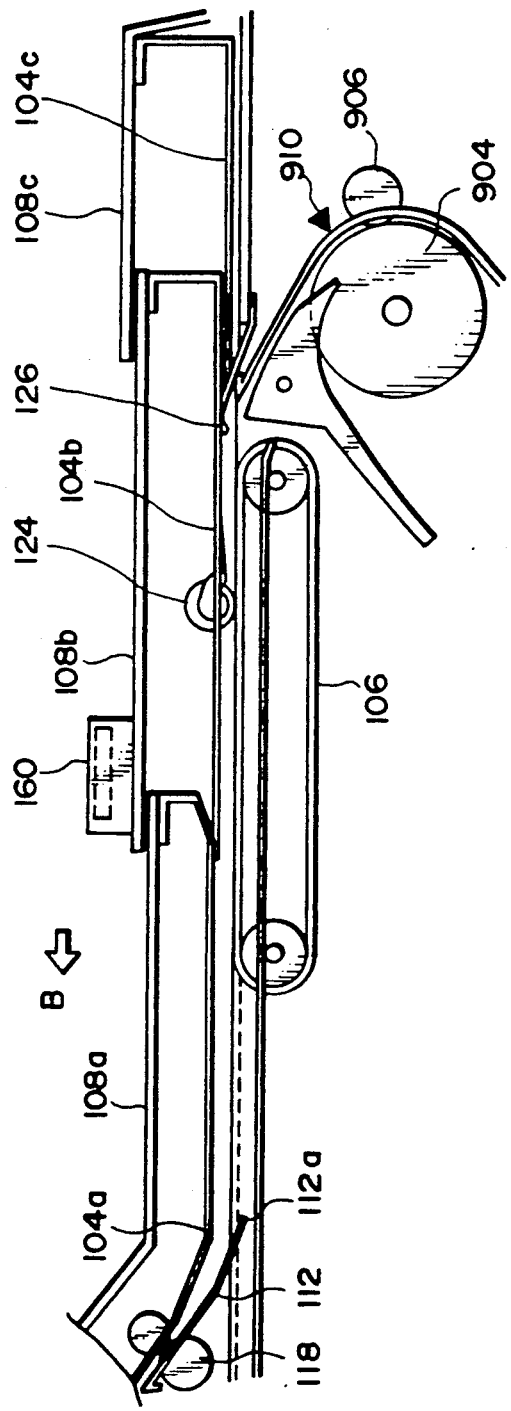
FIGS. 9 to 11 are sectional side elevations showing the conditions of guide plates and outside covers of the embodiment which vary with the position of a discharge unit included in a return section of the embodiment.
Figure 10:
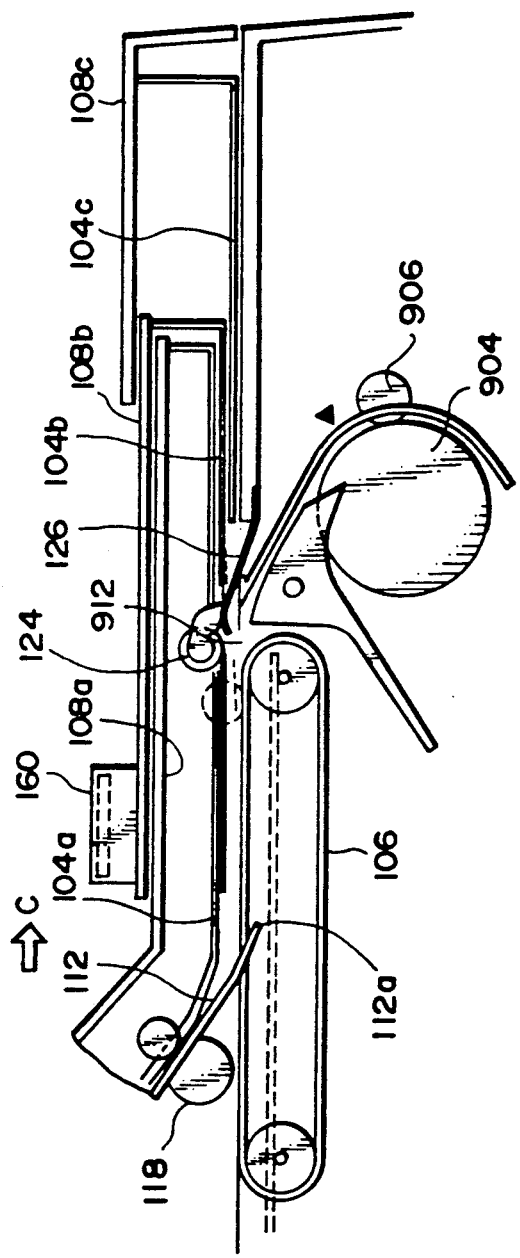
Figure 11:
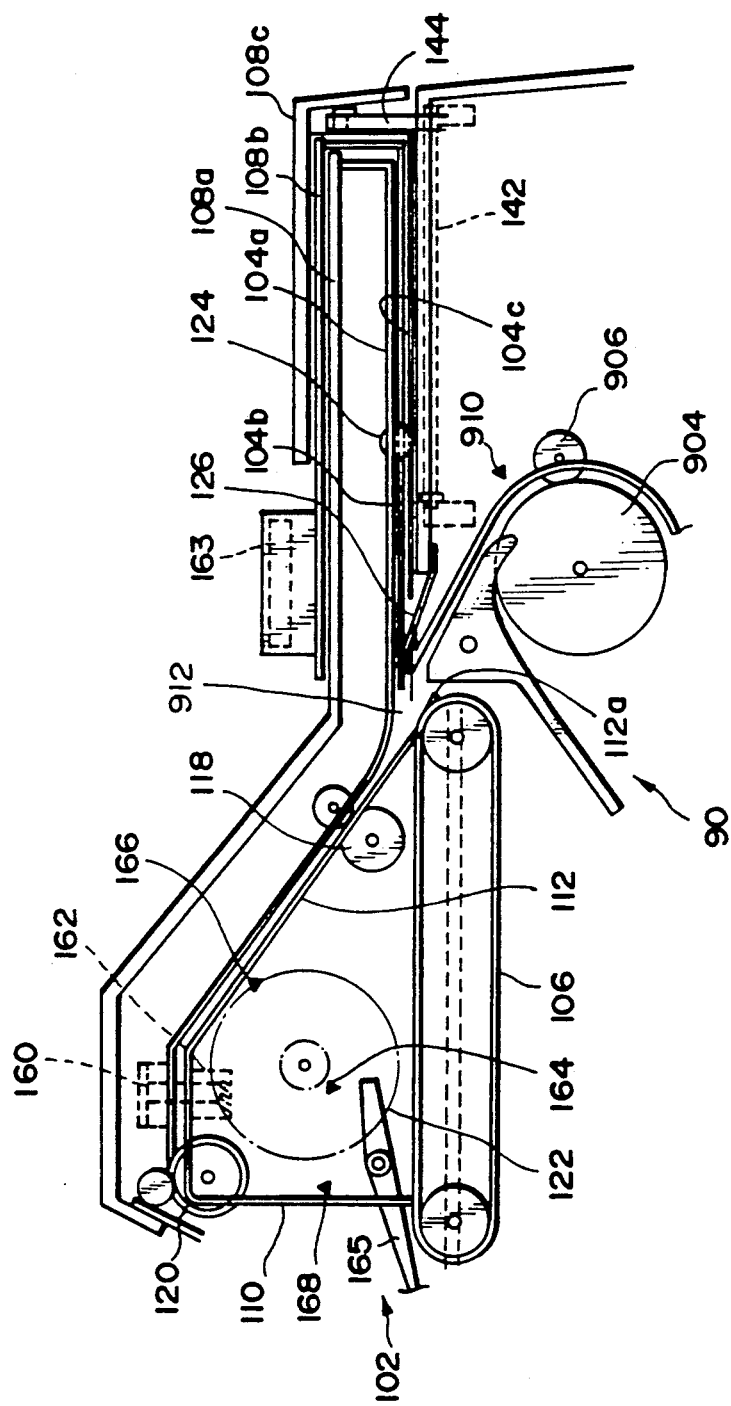

The guide 104 is made up of a plurality of, three in the illustrative embodiment, guide plates 104a, 104b and 104c which are extensible and contractible while overlapping each other. When the discharge unit 102 is moved, the overlapping relation of the guide plates 104a, 104b and 104c changes to extend or contract the entire guide 104. The guide plates 104a, 104b and 104c sequentially overly each other in the direction of document transport so that their overlapping portions may not catch the leading edge of a document being driven along the return path. The guide plates 104a to 104c are individually bent upward at their rear ends to form upright portions. Covers 108a, 108b and 108c are disposed above the guide plates 104a, 104b and 104c and respectively rigidly connected to the upright portions of the guide plates 104a, 104b and 104c. The covers 108a to 108c, like the guide plates 104a to 104c, overlap each other and are extensible. The guide plates 104a to 104c and covers 108a to 108c are shown in their extended position, intermediate position and contracted position in FIGS. 9, 10 and 11, respectively. In FIGS. 9 to 11, the rear ends of the rearmost (rightmost in the figures) guide plate 104c and cover 108c are shown as coinciding with the rear end of the RADF.

However, the rearmost guide plate and cover 104c and 108c are not fixed at the position shown in FIGS. 9 to 11 and are movable between the positions indicated by a solid line and a phantom line in FIG. 6. When the guide plates 104a to 104c are extended and the rearmost guide plate 104c is positioned as indicated by the solid line, the distance between the front end 110 of the discharge unit 102 and the end of the stop 724 against which a document may abut is slightly longer than the length $L_1$ of a document having the minimum size. On the other hand, when the rear ends of the rearmost guide plate 104c and cover 108c are coincident with the rear end of the RADF as indicated by the phantom line in FIG. 6 and the guide plates 104a to 104c and covers 108a to 108c are fully contracted to the position shown in FIG. 11, the distance between the front end 110 of the discharge unit 102 and the document abutting end of the stop 724 is slightly longer than the length $L_2$ of a document having the maximum size. When the document length is between the minimum length $L_1$ and the maximum length $L_2$, the guide plates 104a to 104c and covers 108a to 108c will be extended or contracted such that a distance slightly longer than the length of the document is defined between the front end 110 of the discharge unit 102 and the above-mentioned end of the stop 724. In this configuration, the front end 110 of the discharge unit 102 serves as a rear guide in the event when documents are put on the table 702.

Figure 12:
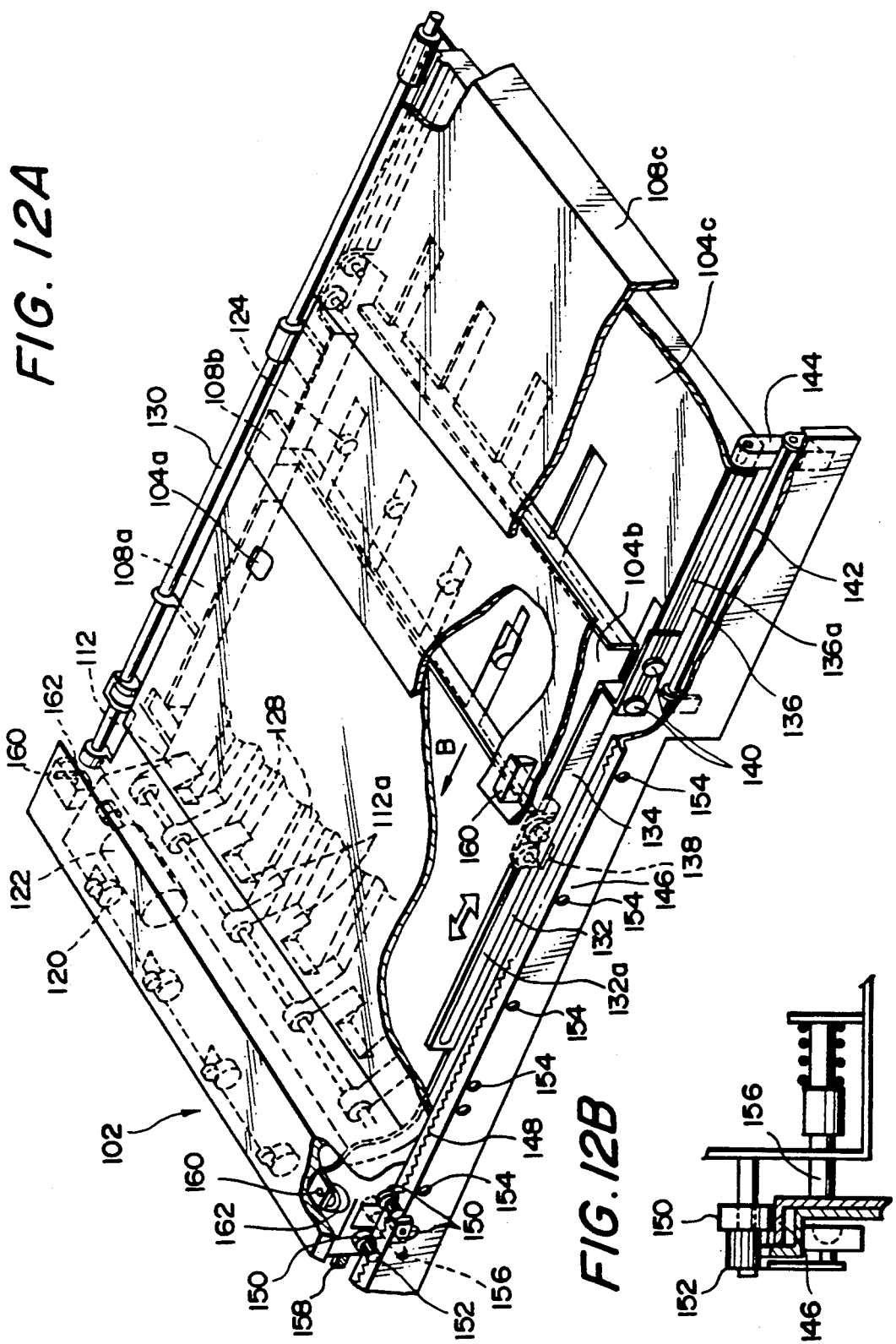
FIG. 12A is a perspective view showing the overall construction of the return section.
FIG. 12B is an enlarged sectional side elevation showing a part of the return section.

As shown in FIGS. 11, 12A and 12B, the discharge unit 102 has a forwardly upwardly inclined lower guide 112, an upper guide configured as a forward extension of the guide plate 104a, discharge roller pairs 118 and 120, and a motor 122 for driving the discharge roller pairs 118 and 120. The lower guide 112 guides a document coming out of the reversal section 90 through an outlet 912 directly toward an outlet which is formed at the upper front end of the discharge unit 102. Also, the lower guide 112 guides a document having been transported by the intermediate belt 106 along the table 702 which forms the return surface of the return path, toward the above-mentioned outlet of the discharge unit 102 by scooping up the document. The discharge roller pairs 118 and 120 are respectively located at an inlet portion 114 and an outlet portion 116 of the discharge unit transport path. A front end portion of the cover 108a is configured to cover the discharge unit 102.

The intermediate belt 106 extends forward away from the outlet 912 of the revesal section 90 such that the upper surface of its upper run is flush with the upper surface of the table 702. The belt 106 is made up of a plurality of endless strips arranged side by side in the widthwise direction of the belt 106. As shown in FIGS. 9, 12A and 12B, rollers 124 each faces respective one of the plurality of strips of the belt 106 when the guide plate 104b is extended. Each roller 124 is constantly biased by a leaf spring. When the guide plate 104b is pulled out in a direction B to a position above the belts 106, the rollers 124 are caused into pressing contact with the individual belts 106 and rotated by the latter, whereby a document is transported. Further, when the guide plate 104b is retracted rearward away from the belts 106 in a direction C shown in FIG. 10, each roller 124 is caused to spring up away from the table 702 and, therefore, from the associated belt 106 by a member 126 which protrudes upward from the table 702. Then, the rollers 124 are housed in a condition shown in FIG. 11 at the rear of the outlet 912 of the reversal section 90. In this condition, a document of the maximum size coming out of the reversal section 90 through the outlet 912 is transported by the roller pairs 118 and 120 along the discharge unit transport path without being obstructed by the rollers 124 or the guide plates 104b and 104c. Subsequently, this document is driven out onto the document stack on the table 702 and caused into abutment against the stop 724 to correct the skew.

Figure 13:
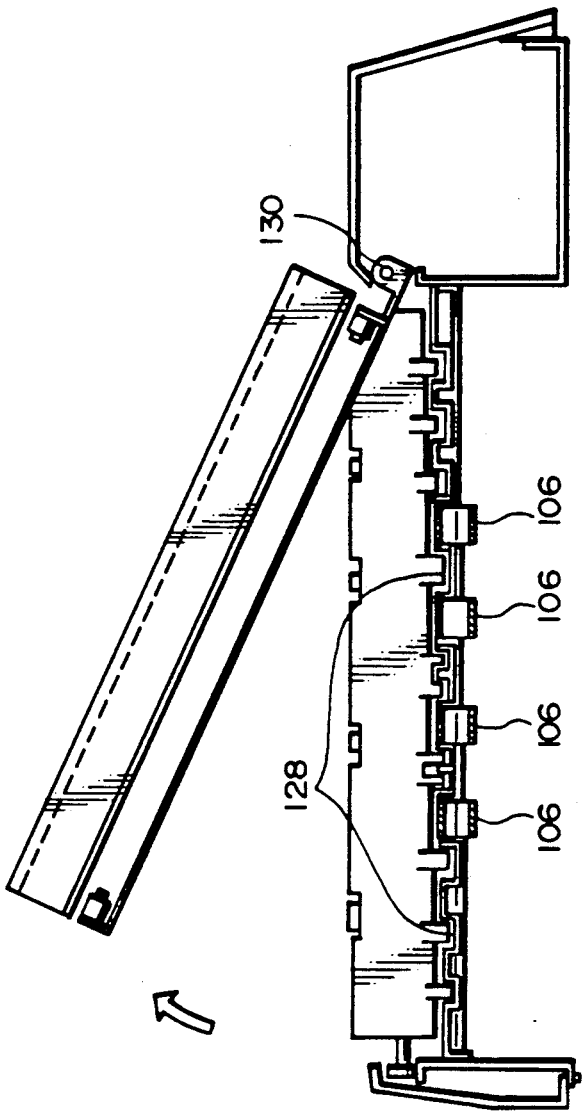
FIG. 13 is a section showing the guide plates in an open position.

As shown in FIGS. 12A, 12B and 13, the table 702 is provided with a plurality of parallel channels 128 between the nearby strips of the intermediate belt 106 and over a range which defines the return path in association with the shift of the discharge unit 102. The channels 128 extend in the intended direction of document transport. Lugs 112a protrude in a comb-like configuration from the lower end of the lower guide 112, and each smoothly movably mates with respective one of the channels 128. The channels 128 and lugs 112a cooperate to allow the lower guide 112 to surely and smoothly pick up the document being transported by the intermediate belt 106 and rollers 124, with no regard to the position of the discharge unit 102. To insure smooth transport of a document with no regard to the document size, it is a prerequisite that the distance as measured from the discharge roller pair 118 and the pressing roller 906 of the reversal section 90 to the driven rollers 124 be shorter than the length of a document as measured in the direction of transport at a position of the discharge unit 102 which is associated with the size of the document.

The means for transporting a document driven out through the outlet 912 of the reversal section 90 to the discharge unit 102 is implemented as a belt. Hence, even when the guide plates 104a to 104c are displaced in matching relation to the document size to in turn displace the driven rollers 124 over a substantial range, the rollers 124 are capable of engaging with the belts. As shown in FIGS. 12A and 12B, the extensible guide plates 104a to 104c and covers 108a to 108c and the discharge unit 102 are slidably supported by a shaft 130 having a circular cross-section. The shaft 130 is positioned at the rear side of the RADF as viewed from the operator's side and extends in the direction of document transport over the entire range of movement of the guide plates 104a to 104c, covers 108a to 108c, and discharge unit 102. The integral guide plate and cover unit and the discharge unit 102 each has a support section which is formed with a circular hole. The shaft 130 extends through such holes.

Links 132, 134 and 136 are respectively affixed to the guide plates 104a, 104b and 104c at both of the front and rear sides of the latter as viewed from the operator's side. The links 132 to 136 extend over substantially the entire lengths of the associated guide plates 104a to 104c. Slots 132a and 134a are respectively formed through the links 132 and 136 to extend over substantially the entire lengths of the latter. Pins 138 and 140 are studded on end portions of the nearby links and respectively received in the slots 132a and 136a, whereby the links 132 to 136 are connected together.

As shown in FIGS. 11 and 12A, a stationary shaft 142 is provided on a front frame member of the RADF as viewed from the operator's side. The shaft 142 has a length corresponding to the distance over which the rearmost guide plate 102c is movable. A lever 144 is rotatably mounted on the front right end of the guide plate 102c as viewed in the figures. The lever 144 has a recess at its free free end portion which is slidably engaged with the lever 144 by gravity of by a spring. A guide rail 146 and a rack 148 are affixed to the other portion of the front frame member of the RADF and extend in the direction of document feed. A plurality of rollers 150 are mounted on the front side wall of the discharge unit 102 and supported by the upper surface of the guide rail 146. Pinions 152 each being coaxial with respective one of the rollers 150 are meshed with the rack 148. In this configuration, the discharge unit 102 is movable to any predetermined position matching a document size. Click recesses 154 are formed in the front frame of the RADF in positions each corresponding to a respective one of standard paper sizes, while a click pin 156 is studded on the front end of the discharge unit 102. The click pin 156 may be engaged with any one of the click recesses 154 to position the discharge unit 102. The click recesses 154 can be located extremely close to each other and, therefore, accommodate a broad range of document sizes. When a document of medium size is to be transported, the tip of the click pin 156 is engaged with an undulated portion of the inner surface of the frame to thereby position the discharge unit 102. A lever 158 is provided on the front end of the discharge unit 102 and may be operated to cause the click pin 156 to engage with either one of the click recess 154 and the above-mentioned inner surface of the frame. Hence, the discharge unit 102 can be readily moved to and held at a desired position.

In the discharge unit 102, the upper guide defining the transport path and the cover are implemented as a part of the guide plate 104a and a part of the cover 108a, respectively. As shown in FIGS. 11 and 12A, magnetic pins 160 extend downward respectively from the front side and the rear side of the guide plate 104a adjacent to the front end of the latter (adjacent to the discharge roller pair 120). Magnetic attracting means in the form of a permanent magnet 162 is mounted on the body of the discharge unit 102 and provided with a relatively long channel which extends across the direction of document transport. When the magnetic pins 160 are attracted onto the permanent magnet 162 and received in the channel of the latter, the guide plate 104a and cover 108a are locked to the body of the discharge unit 102. The guide plates 104a and cover 108a are easily removable from the body of the discharge unit 102 when it is desired to uncover the transport path. The discharge unit 102 is slidably mounted on the shaft 130 through two spaced support sections which are provided on the rear side of the discharge unit 102. One of the support sections is held, with hardly any clearance, between a bifurcated support section which slidably mounts the guide plate 104a on the shaft 130. Hence, the relative position of the discharge unit 102 and the guide plate 104a and cover 108a is maintained constant. When the pinions 152 are rotated to move the discharge unit 102, the pins 140 of the link 134 slide in the sots 132a and 136a of the links 132 and 136 with the result that the guide plates 104a to 104c and covers 108a to 108c are extended or contracted.

A knob 163 is affixed to the front side of the cover 108b which is associated with the intermediate guide plate 104b. The knob 163 is so located as not to obstruct the contraction of the covers 108a to 108c and, when the covers 108a to 108c are extended, to be located at substantially the intermediate between opposite ends. In this configuration, wherever the guide plates 104a to 104c and covers 108a to 108c are located, the lever 144 and the magnetic pins 160 will be respectively released from the shaft 142 and the permanent magnet 162 when the knob 160 is held by hand and lifted. Then, as shown in FIGS. 13, the guide plates, covers and links will be angularly moved upward about the shaft 130 to uncover the document return path. Since the links 132, 134 and 136 of the guide plates 104a, 104b and 104c are connected together by the spaced pins 138 and 140 which are received in the slots, the three links at each of the front at rear sides as viewed from the operator's side are maintained in a linear configuration as viewed from the side. This prevents the guide plates and covers from being irregularly positioned or from hanging down at opposite ends thereof. In addition, the guide plates are readily unlocked without resorting to a substantial effort.

Figure 15:
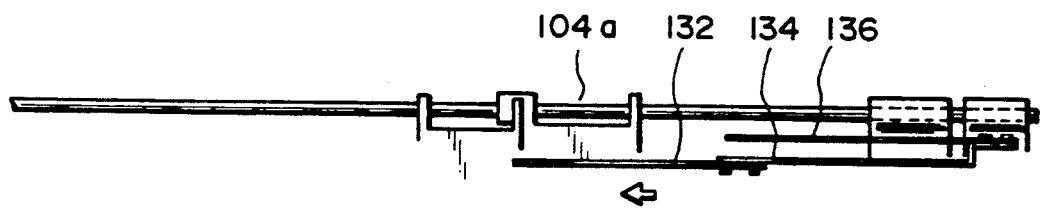
Figure 16:
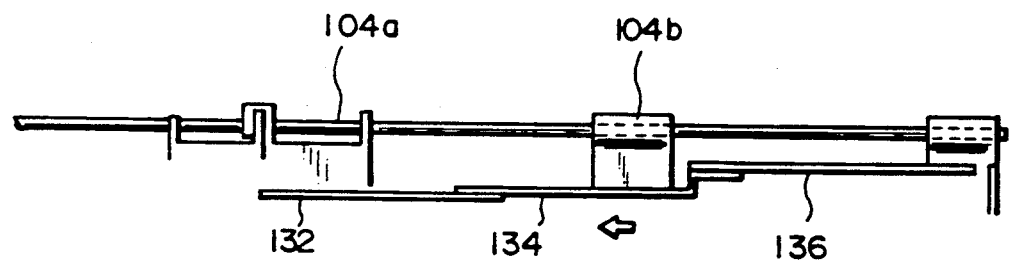
Figure 17:
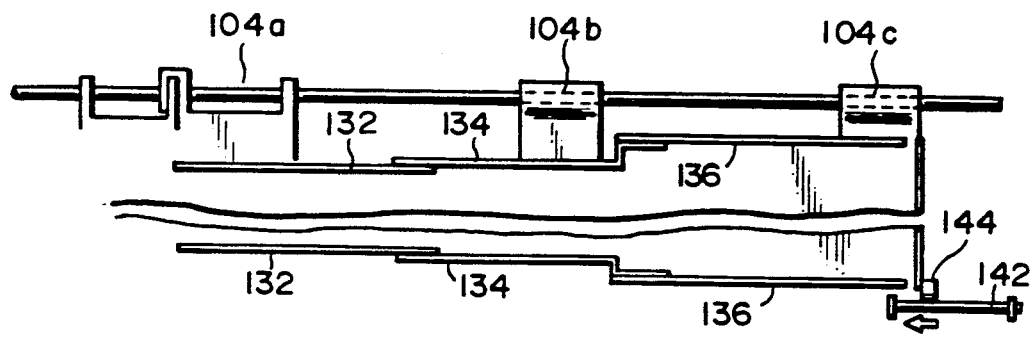

A reference will be made to FIGS. 14 to 17 for describing how the positions of the overlapping links 132, 134 and 136 and the positions of the same relative to the guide shafts 130 and 142 change as the discharge unit 102 is moved from the position of FIG. 11 which matches the maximum document size to the position of FIG. 6 which matches the minimum document size. In FIGS. 15 and 16, only the links 132 to 136 located at the rear side as viewed from the operator's side are shown for simplicity.

Figure 14:
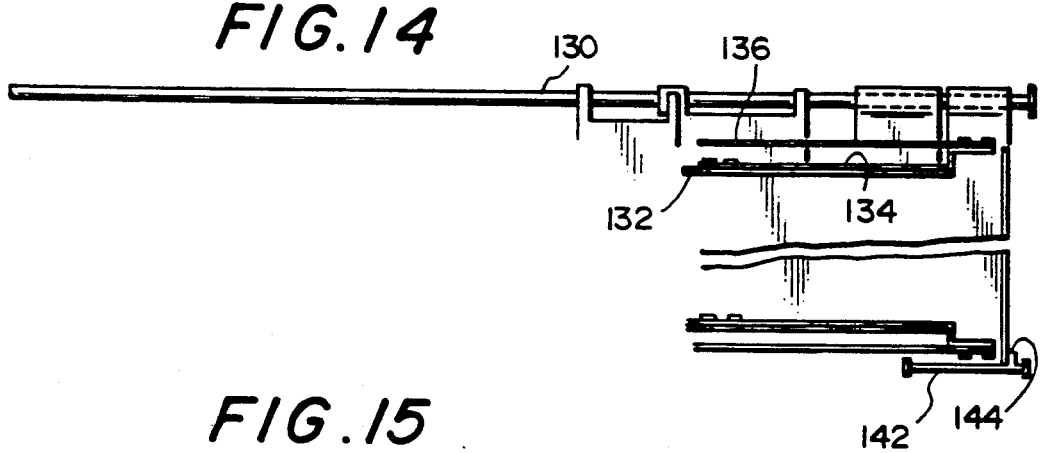
FIGS. 14 to 17 are views showing the positions of links associated with the guide plates which sequentially vary as the guide plates are moved from the most contracted position to the most extended position.

FIG. 14 shows a condition in which the three associated links 132 to 136 are fully contracted. The link 132 is pulled out together with the discharge unit 102 and guide plate 104a, as shown in FIG. 15. Then, the link 134 is pulled out by the rear end of the link 132 together with the guide plate 104b, as shown in FIG. 16. Finally, the lever 144 slides forward along the shaft 142 to the position shown in FIG. 17 which matches the minimum document size. When the discharge unit 102 is moved from the position associated with the minimum document size to the position associated with the maximum document size, the links 132 to 136 will be contracted in the opposite sequence to the above-stated sequence.

As stated above, when the discharge unit 102 is located at a position associated with the maximum document size, the guide plates and covers are located at the rear of the outlet 912 of the reversal section 90 (right-hand side in FIG. 6) to allow the whole table 702 to be used. It is to be noted that the procedure for pulling out the links described above is only illustrative. If desired, the links 132 and 134 may be pulled out at the same time or all the links 132 to 136 may be moved along the shaft 142.

When the discharge unit 102 is shifted to a position matching a document size by the above procedure, the guide of the return path and the cover are set up automatically.

As shown in FIGS. 6 to 11, the discharge unit 102 is provided with a separating plate 165, a mechanism, not shown, for actuating the separating plate 165, a separating plate sensor 164, a document discharge sensor 166, a position sensor 168 for determining whether or not the discharge unit 102 is correctly positioned. The position sensor 168 senses the trailing edge of a document having been abutted against the stop 724 to see if the position of the discharge unit 102 is correct. When the position sensor 168 does not sense the leading edge of such a document, it is determined that the discharge unit 102 is located remote from the trailing edge of the document or that the discharge unit 102 has moved forward more than expected and thereby caught the trailing edge of the document with its front end 110. Then, the feed of such documents is inhibited, and the operator is urged to correct the position of the discharge unit 102. The lever 158, FIG. 12A, provided on the front end of the discharge unit 102 is accessible to cancel the click. Hence, the discharge unit 102 can be moved easily and smoothly to a desired position.

The functions of the separating plate 165 and its associated members are the same as those of the prior art RADF and will not be described herein.

The operation of the illustrative embodiment having the above construction will be described with reference to the flowcharts shown in FIGS. 18 and 19.

DOCUMENT FEED (FIG. 18)

A stack of documents arranged in order of page are stacked face up on the table 702 with their leading edges abutting agains the stop 724. Then, the side fences 704 are shifted to hold the document stack therebetween. In this condition, the discharge unit 102 is moved to a position matching the size of the documents. When a print key provided on the copier is pressed, the resultant feed signal energizes the solenoid 722 associated with the stop 724 and the solenoid associated with the presser plate 720. As a result, the stop 724 is retracted away from the leading edge of the document stack while the presser plate 720 presses the document stack against the pick-up rollers 706 and 708. By the rotation of the pick-up rollers 706 and 708, the document stack is driven forward in a wedge configuration with the lowermost document forming the tip of the wedge. The endless belt 726 and separation roller 732 separate the lowermost document from the others and drive it toward the pull-out roller 734. When the register sensor 740 senses the leading edge of the document, the drive of the separation roller 732 is interrupted by the clutch with the result that the document is transported to the glass platen 504 by the pull-out roller 734 only. The transport belt 802 further transports the document on and along the glass platen 504. When the photoelectric sensor 712, FIG. 7, senses the slit 714a of the disk 714, the drive of the pick-up rollers 706 and 708 is interrupted. Consequently, the pick-up rollers 706 and 708 are brought to a stop when their removed portions become flush with the surface of the table 702. At a predetermined time after the register sensor 740 has sensed the trailing edge of the document (measured in terms of output pulses of an encoder), the transport belt 802 is reversed to cause the document into abutment against the scale 812 and then stopped. This corrects the skew of the document and thereby stops the document at the predetermined exposing position. In this condition, the document is illuminated for imagewise exposure.

DOCUMENT DISCHARGE (FIG. 19)

In response to an end-of-scan signal fed from the copier body 502, the transport belt 802 is rotated again in the forward direction to feed the document to the reversal section 90. Then, a one-sided document or a two-sided document whose one side has already been scanned is driven into the return section 100 and transported along the return path which is defined by the intermediate belt 106 and table 702 and the extensible guide plates 104a to 104c. The lower guide 112 of the discharge unit 102 scoops up the document coming out of such a return path, and the discharge rollers 118 and 120 discharge the scooped document onto the document stack on the table 702. On the lapse of a predetermined time after the discharge sensor 166 has sensed the leading edge of the document, the stop 724 is moved into contact with the top of the document stack. The document driven out of the discharge unit 102 is, therefore, abutted against the stop 724 to correct the skew.

As shown in FIG. 8A, the upper surface of the table 702 may be provided with ribs 702a having a suitable height and spaced apart from pawl portions which are provided at spaced locations on the stop 724. In such a configuration, the documents stacked on the table 702 will be pressed by the stop 724 to wave along the undulation of the table 702. This prevents the document driven out of the discharge unit 102 from getting under the stop 724.

An arrangement may be made such that while a document existing on the glass platen 504 is being scanned, i.e., before the end of illumination, a driving force is transmitted to the feed section via a clutch to separate and feed the next document. Such an arrangement will reduce the intervals between the successive documents and transport them at high speed, thereby reducing the total period of time necessary for copying operation.

The separating plate 165 may be laid on the top of the paper stack at the beginning of the copying operation. Then, the sensor 164 will sense the plate 162 when the latter is brought to the lowermost position, determining that all the documents have made a round through the RADF.

It often occurs that the documents made a round through the RADF are deformed in waves. Preferably, therefore, the pick-up rollers 706 and 708 are rotated to cause the documents to vibrate up and down before they are fed out again. At this instant, the presser plate 720 and stop 724 are retracted away from the documents while the pick-up rollers 706 and 708 exert a driving force in the direction of transport. This causes the leading edge of the document stack to advance to the vicinity of the contacting portion of the separation roller 732 and endless belt 726, whereby the document stack is neatly arranged in a wedge configuration as stated previously. The so rearranged document stack will be refed in response to a feed signal.

In summary, the present invention achieves various unprecedented advantages as enumerated below.

(1) Documents of a broad range of sizes can be returned to a document feed position without resorting to an exclusive return path. This contributes a great deal to the miniaturization of an RADF as well as to the improvement in operability.

(2) Since a discharge section is movable on a document table in an intended direction of document transport, documents of various sizes can be readily returned to overly a stack of documents located in the document feed position.

(3) A document can be returned onto the document stack located at the document feed position by being surely and smoothly picked up with no regard to the position of the discharge section.

(4) The discharge section is movable on the document to deal with documents of various sizes. A guide defining a return path whose length is variable is implemented by a plurality of extensible guide plates which overlap each other. Such guide plates can be smoothly extended and contracted by a simple mechanism and accommodated in a narrow space. Further, the guide plates automatically form a guide whose length follows the length of the return path.

(5) Cover members each is associated with respective one of the guide plates. The cover members are extensible together with the guide members to cover the RADF except for the document loading range.

(6) Despite that the position for discharging a returned document is changed over a broad range and to a desired position depending on the size of documents, the upper guide of the return path is smoothly extensible in matching relation to the document discharge position. When the upper guide is contracted and retracted to the rear of the return path, the entire area of the document table is effectively used. This is also successful in miniaturizing the RADF.

(7) The guide means is rotatable about and slidable along a guide shaft which extends in the intended direction of document feed at the rear side of the document table as viewed from the operator's side. The return path, therefore, can be opened wide even when the length of the return path is changed, thereby promoting easy access for the removal of a jamming sheet.

(8) In a RADF of the type using a rear portion of its document table for the return of a document, a document having any desired length can be fed by a simple construction. Even when the document size and, therefore, the length of the return path is changed, a returned document can be surely laid on the document tack on the document table.

(9) Pressing members are provided on the extensible guide plates to press an endless belt. The position where the pressing members press the endless belt is variable in interlocked relation to the displacement of the discharge section so as to promote efficient return of a document.

Various modifications will become possible for those skilled in the art after receiving the teachings of the present disclosure without departing from the scope thereof.

What is claimed is:

1. A recycling automatic document feeder for repetitively feeding documents one by one to a predetermined exposing position of an image forming apparatus, comprising:

document feeding means comprising a document table to be loaded with a stack of a plurality of documents, and a feed mechanism for feeding said stack of documents one by one, the lowermost document being first;

document transporting means comprising a transport mechanism for transporting the document fed by said document feeding means to the exposing position and discharging said document after imagewise exposure; and document returning means comprising a return path for discharging the document from said document transporting means such that said document lies on the stack of documents on said document table, said return path comprising a rear part of a document stack loading range available on an upper surface of said document table with respect to an intended direction document feed;

said document returning means further comprising a discharge section movable on said document table in the intended direction of document feed in matching relation to a document size, said discharge section comprising a transport guide for picking up the document being returned toward said document table, which defines said return path, and discharging said picked up document onto the stack of paper sheets on said document table;

said document returning means further comprising guide means comprising a plurality of guide plates which overlap each other and are extendible and contractible in response to a movement of said discharge section for guiding the document turned over and discharged by said document transporting means to said discharge section;

said guide means being slidable along and rotatable about a guide shaft which extends in the intended direction of document feed at a rear side of said document table as viewed from operator's side.

2. An automatic document feeder as claimed in claim 1, wherein said document table of said document feeding means comprises a plurality of channels extending in the intended direction of document feed and over a movable range of said discharge section;

said transport guide comprising comb-like lugs extending downward from said transport guide and each being slidably received in respective one of said channels of said discharge section.

3. An automatic document feeder as claimed in claim 1, wherein said document returning means further comprises a plurality of cover members each being constructed integrally with respective one of said guide plates of said guide means for forming an outside cover, said cover members being extendible and contractible while overlapping each other in response to extension and contraction of said guide plates.

4. An automatic document feeder as claimed in claim 1, wherein when said discharge section is retracted to a rearmost position associated with documents of a maximum size, said guide plates of said guide means are contracted rearward away from said return path while overlapping each other.

5. An automatic document feeder as claimed in claim 1, further comprising document reversing means comprising a reverse mechanism for turning over the document discharged by said document transporting means.

6. A recycling automatic document feeder for repetitively feeding documents one by one to a predetermined exposing position of an image forming apparatus, comprising:

document feeding means comprising a document table to be loaded with a stack of a plurality of documents, and a feed mechanism for feeding said stack of documents one by one, the lowermost document being first;

document transporting means comprising a transport mechanism for transporting the document fed by said document feeding means to the exposing position and discharging said document after imagewise exposure; and document returning means comprising a return path for discharging the document from said document transporting means such that said document lies on the stack of documents on said document table, said return path comprising a rear part of a document stack loading range available on an upper surface of said document table with respect to an intended direction document feed;

said document returning means further comprising a discharge section movable on said document table in the intended direction of document feed in matching relation to a document size, said discharge section comprising a transport guide for picking up the document being returned toward said document table, which defines said return path, and discharging said picked up document onto the stack of paper sheets on said document table;

said document returning means further comprising a document returning member located in close proximity to an end of said document table opposite to a document feed side and extending in the intended direction of document feed from a position where the document is to be discharged via said document transporting means;

wherein said document returning member comprises an endless belt.

7. An automatic document feeder as claimed in claim 6, further comprising document reversing means comprising a reverse mechanism for turning over the document discharged by said document transporting means.

8. An automatic document feeder as claimed in claim 7, wherein said endless belt has an upper run whose upper surface is substantially flush with an upper surface of said document table and being driven to move from an outlet of said document reversing means toward said discharge section of said document returning means.

9. An automatic document feeder as claimed in claim 8, wherein said document returning means further comprises pressing means retractably pressing the upper surface of the upper run of said endless belt in response to a movement of said discharge section.

10. A recycling automatic document feeder for repetitively feeding documents one by one to a predetermined exposing position of an image forming apparatus, comprising:

document feeding means comprising a document table to be loaded with a stack of a plurality of documents, and a feed mechanism for feeding said stack of documents one by one, the lowermost document being first;

document transporting means comprising a transport mechanism for transporting the document fed by said document feeding means to the exposing position and discharging said document after imagewise exposure; and document returning means comprising a return path for discharging the document from said document transporting means such that said document lies on the stack of documents on said document table, said return path comprising a rear part of a document stack loading range available on an upper surface of said document table with respect to an intended direction document feed;

said document returning means further comprising a discharge section movable on said document table in the intended direction of document feed in matching relation to a document size, said discharge section comprising a transport guide for picking up the document being returned toward said document table, which defines said return path, and discharging said picked up document onto the stack of paper sheets on said document table;

said document returning means further comprising a document returning member located in close proximity to an end of said document table opposite to a document feed side and extending in the intended direction of document feed from a position where the document is to be discharged via said document transporting means;

wherein said document table of said document feeding means comprises a plurality of channels extending in the intended direction of document feed and over a movable range of said discharge section, said transport guide comprising comb-like lugs extending downward from said transport guide and each being slidably received in respective one of said channels of said document table.

* * * * *